May 5, 1936.  C. G. MUNTERS ET AL  2,039,736
REFRIGERATION
Filed Nov. 17, 1931
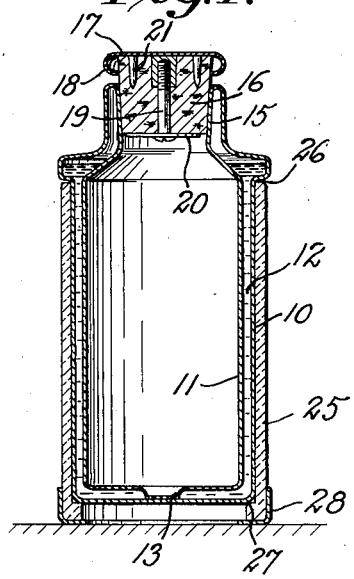
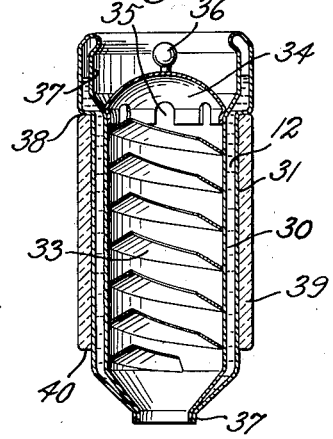
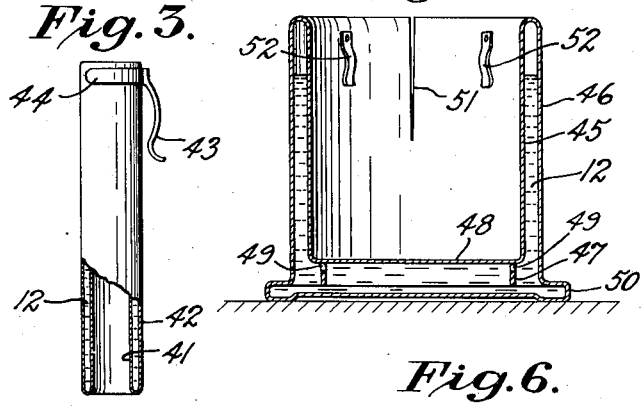
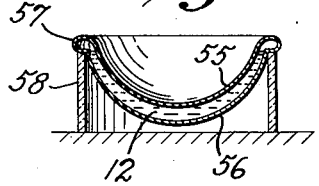
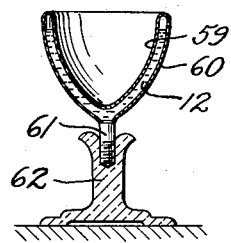

Patented May 5, 1936

2,039,736

UNITED STATES PATENT OFFICE 2,039,736

REFRIGERATION

Carl Georg Munters and Alvar Lenning, Stockholm, Sweden, assignors to Platen-Munters Refrigerating System, Aktiebolag, Stockholm, Sweden, a corporation of Sweden Application November 17, 1931, Serial No. 575,569
In Germany November 17, 1930

9 Claims. (Cl. 62—1)

This invention relates to refrigeration and more particularly to devices for refrigerating liquids and solids such as beverages and foods which will, for convenience be hereinafter referred to as foods.

The invention provides more specifically a double-walled receptacle which is adapted to receive or contain the food or to be inserted in the food or to be contacted therewith and which has sealed between the walls thereof a substance capable of freezing within the normal range of temperatures of artificial refrigeration and which possesses other desirable characteristics to be hereinafter set forth. The receptacle is artificially cooled to a temperature such that the substance becomes frozen and thereafter is contacted with the food and the latent heat of fusion of the substance is utilized for obtaining the desired refrigeration.

An object of the invention is to provide for the cooling of food by indirect contact with the refrigerating substance and to prevent contamination of the food by the melting refrigerant.

Another object is to provide a cooling device of the above described character which may be used repeatedly over a considerable period of time without breaking.

A further object is to provide a refrigerating receptacle in which the food may be prepared or served and which may be conveniently handled and which presents a neat and pleasing appearance and may be placed on the dining table for serving purposes.

Still further objects and advantages of the present invention will be apparent by referring to the following description taken in connection with the accompanying drawing in which certain preferred forms of the invention are shown for purposes of illustration.

In the drawing:

Fig. 1 is a longitudinal sectional view of a beverage shaker constructed in accordance with the present invention;

Fig. 2 is a longitudinal sectional view of a device for cooling liquids in accordance with the present invention;

Fig. 3 is a side elevation partly in section of another embodiment of the invention;

Fig. 4 is a longitudinal sectional view of a receptacle for receiving and cooling a food container such as a jar or bottle;

Fig. 5 is a sectional view of a dish for serving food constructed in accordance with the present invention; and Fig. 6 is a sectional view of a drinking utensil embodying the present invention.

In the several figures of the drawing similar and corresponding parts are designated by similar reference numerals.

In the following description and in the claims various details of the invention will be identified by specific names for convenience but they are intended to be as generic in their application as the art will permit.

Referring more particularly to the drawing, Fig. 1 shows a beverage container having double cylindrical walls comprising an outer wall 10 and inner wall 11 which are separated to provide an annular space therebetween in which a refrigerating substance 12, of a class to be hereinafter described, is contained and which are joined and hermetically sealed to permanently enclose said substance. Said walls may be contacted for mechanical reasons at various points as by extension 13 which is formed in wall 11 and engages the inner surface of wall 10.

The container is formed with a constricted neck portion 15 which is adapted to receive a closure means such as cork or stopper 16. Said stopper 16 may be provided with a top piece or cover 17 of suitable material, such as metal which is inturned at its ends and provides an annular section 18 by which the stopper may be readily handled. Said top piece 17 may be secured to stopper 16 as by a bolt 19 which extends from a bottom plate 20 and holds said bottom plate and top piece in clamping engagement with said stopper. Pins 21 may be attached to said top piece and may extend into said stopper to prevent relative turning movement between the parts of the assembly.

Walls 10 and 11 are preferably formed of a material such as metal having a relatively high heat conductivity and having an appreciable elasticity so as to minimize the tendency of the receptacle to break when the refrigerating substance contained therein is repeatedly frozen and melted. This elasticity is of particular importance when certain types of refrigerating mediums are employed as will be hereinafter set forth.

The outer wall 10 is formed with an elongated cylindrical section which is adapted to engage an outer sleeve 25 of heat insulating material, such as phenol condensation product which minimizes the loss of heat by radiation to the surrounding air and facilitates the handling of the device and prevents transfer of heat from the hand to the receptacle. Wall 10 may also be formed with a shoulder 26 which is adapted to seat over the top of sleeve 25 and to position the receptacle therein. Sleeve 25 may also be formed with an annular shoulder 27 against which the bottom of the receptacle is adapted to rest and may be provided with an annular member 28 of suitable material, such as metal which is adapted to rest upon the supporting surface and support the entire assembly. The arrangement is such that the receptacle may be removed from sleeve 25 for cooling purposes and may be readily applied to and frictionally held within said sleeve for purposes of use in preparing the food or beverage.

It is desirable to use a refrigerating substance 12 within the walls of the receptacle which possesses a comparatively high latent heat of fusion and which freezes within the normal range of temperatures of artificial refrigeration. Certain substances however, for example water, which have the above characteristics, also have a comparatively high coefficient of expansion on freezing, that is, they increase in volume to a substantial extent on freezing. If a substance of this character were employed within the receptacle, the expansion would exert a force on the walls of the receptacle which would tend to rupture the same. It is accordingly desirable to utilize a substance which, in addition to the above characteristics, possesses a relatively low coefficient of expansion on freezing or in certain instances to utilize a substance which possesses a negative coefficient of expansion on freezing, that is, which contracts in volume when changing from the liquid to the solid state.

As a further consideration, it is to be noted that the receptacle may be subjected to the temperature of boiling water for purposes of cleaning. If the refrigerating substance 12 has a boiling point which is equal to or below that of water, a substantial vapor pressure may be set up within the receptacle due to the temperature obtained when the receptacle is cleaned, which pressure may in certain instances be sufficient to rupture or damage the receptacle or to limit the useful life thereof. Accordingly it is desirable to utilize a refrigerating substance which has a boiling point higher than that of water so that the vapor pressure within the receptacle is minimized when the same is subjected to high temperatures.

Applicants have found that certain eutectic solutions of various salts in water have the above mentioned desirable characteristics, that is, they possess a coefficient of expansion on freezing which is less than that of water and their boiling points are above the boiling point of water. The following are examples of certain salt solutions which may be thus employed, together with the approximate percentages of the salt which is contained in the eutectic solution and the approximate melting point thereof:

| Salt | Eutectic proportion in water | Melting point |
| --- | --- | --- |
|  | Per cent | °C. |
| MgSO₄ | 19 | −3.9 |
| Na₂CO₃ | 5.9 | −2.1 |
| Na₂SO₄ | 3.8 | −1.2 |
| Na₂HPO₄ | 1.6 | −0.9 |
| BaCl₂ | 22.5 | −7.8 |
| ZnSO₄ | 27.2 | −6.5 |
| KCl | 19.7 | −11.1 |
| NH₄Cl | 18.7 | −15.8 |
| NH₄NO₃ | 41.2 | −17.4 |

It is to be noted that the eutectic solutions of all of the above salts have melting or freezing points below the freezing point of water and within the normal range of temperatures of artificial refrigeration. Furthermore, their coefficient of expansion on freezing is appreciably less than that of water. For example, water on freezing expands approximately 10% of its volume, whereas the above mentioned eutectic solutions expand only approximately 2% of their volume on freezing. Furthermore, the boiling point of all of the above mentioned solutions lies above 100° C., the boiling point of water.

When employing the above mentioned solutions, it is preferable to use a metal for the receptacle which possesses a sufficient amount of elasticity to permit the above mentioned small amount of expansion to take place in the substance upon freezing without danger of cracking or injuring or otherwise straining the receptacle. Various metals, such as aluminum, stainless steel, etc., are suitable for this purpose.

In certain instances it may be desirable to employ a refrigerating substance which possesses a negative coefficient of expansion on freezing in which case the walls of the receptacle may or may not be constructed of elastic material as above mentioned. Certain organic substances have such a negative coefficient of expansion and in addition, freeze at temperatures within the normal range of temperatures of artificial refrigeration and have boiling points substantially above the boiling point of water. The following are examples of such organic substances that may be employed:

m-creosol, dimethylaniline, o-dibrombenzol, o-chloraniline, a-bromnaphthaline, o-anisidine, p-anisaldehyde, o-anisaldehyde.

If the above organic substances are employed, the receptacle may be constructed of a more fragile material, such as glass, inasmuch as stresses are not set up when the above substances freeze by reason of their negative coefficient of expansion. Furthermore, the boiling points of all of the above substances are so greatly in excess of the boiling point of water that they will not develop any appreciable vapor pressure when the receptacle is subjected to boiling water for cleaning purposes.

In the use of the above described devices it is contemplated that the receptacle, together with the refrigerating substance contained therein will be removed from the outer sleeve 25 and placed in a low temperature, as for example in a refrigerator, in which the temperature is maintained sufficiently low to cool the medium 12 below the freezing point thereof and to cause the same to become frozen. Thereafter, the receptacle is removed from the refrigerator and the food or beverage is placed therein and treated as desired. The receptacle is preferably placed in the heat insulating sleeve 25 in order to conserve heat and to facilitate handling and the latent heat of fusion of the substance is utilized for refrigerating the food as the substance 12 melts. The food is thus cooled and may be maintained in a cold condition without coming in direct contact with the refrigerating substance as would be the case were pieces of ice inserted directly therein. After the device has been used in the manner above described, it may be cleaned by boiling water without injurious effects for reasons above specified and may then be reinserted in a cold atmosphere for again freezing the refrigerating substance. The device may be repeatedly used in this manner for a considerable period of time inasmuch as the parts are all of considerable mechanical strength and excess stresses and strains therein are avoided in the manner above described.

The invention may take various other forms as illustrated in Figs. 2 to 6, all of which show receptacles having double walls between which the above mentioned refrigerating substance is held and which are adapted to contact with the food in various ways.

Referring more particularly to Fig. 2, a cooling device is disclosed which is adapted to be inserted in or applied to a food container, as for example, a glass after which the food or beverage may be passed therethrough for cooling purposes. This device comprises a receptacle having inner and outer walls 30 and 31 respectively, which are separated to provide a space for receiving refrigerating substace 12 in the manner described in connection with Fig. 1. These walls may be joined as at 32 to provide a rigid construction. The inner cylindrical surface of the receptacle is adapted to receive a transverse helical fin 33 which is frictionally engaged therein and which is in heat conducting engagement with the inner wall 30 and provides a heat radiating fin for facilitating the cooling operation. A cap 34 is also inserted within wall 30 and is frictionally held therein and is adapted to engage the fins 33 and secure the same in the desired position. Said cap is provided with apertures 35 through which the fluid may pass and which are positioned to discharge the fluid over the above-mentioned fins. A handle 36 may be formed on said cap to assist in the removal thereof. The upper part of the receptacle may be flared as at 37 to facilitate the insertion of the fins 33 and cap 35 and may be provided with a shoulder 38 which is adapted to engage a heat insulating sleeve 39 which may be formed of material similar to sleeve 25 above described. The lower portion of the receptacle may be constricted as at 32 in order to control the discharge of the liquid therefrom.

The above device is intended to be used in a manner similar to that described in connection with Fig. 1. When the substance 12 has been frozen the device is placed within the sleeve 39 and may be held above or set on a glass or other receptacle after which the liquid may be poured through the device and in passing over the fins 33 becomes cooled and is thereafter discharged into the glass. If desired, the lower portion 40 of sleeve 39 may be constructed so as to fit over the top of the glass for the above purpose.

A further modified form of device is shown in Fig. 3 in which inner walls 41 and outer walls 42 are formed in a manner similar to walls 10 and 11 of Fig. 1 and have a substance 12 secured therebetween. This device is of tubular form and is adapted for example to be inserted within a glass for contacting with the liquid therein and thereby cooling the same. The receptacle may be provided with a clip 43 which may be frictionally or otherwise secured thereto as by strap 44 and is adapted to engage the rim of the glass and support the receptacle therein.

In the device illustrated in Fig. 4, inner walls 45 and outer walls 46 are formed in a cylindrical shape and adapted to receive the straight part of a bottle or jar. The space between said walls contains the above mentioned cooling substance 12 which is hermetically sealed therein in the manner specified above. The inner walls may be extended by flanges 47 below the bottom 48 of the receptacle for strengthening purposes in which case apertures 49 are formed therein to prevent gases and vapors from being trapped below said bottom 48. The outer wall may also be flared as at 50 to provide a base on which the receptacle is supported. The container above described is preferably made as high as the straight portion of the bottle intended to be cooled so as to be in cooling contact with a substantial portion of a material therein. A substantial height is desirable as it is necessary to cool the upper portion of the liquid within the bottle in order to secure circulation thereof and to insure that the entire contents of the bottle will be properly refrigerated.

If desired the walls 45 and 46 of the above described receptacle may be separated or split as at 51 to provide resilience whereby the bottle may be more firmly gripped. Spring members 52 may also be secured on the inner wall 45 in heat contacting relationship therewith in order to more firmly grip the bottle or to adapt the device to use with bottles of various shapes. It is to be understood however that either the clips 52 or the split feature may be omitted in any particular instance. In the above described device it is usually unnecessary to provide a heat insulating jacket inasmuch as the device is subjected to a minimum amount of handling. This device is particularly useful for cooling bottles which are to be used directly on the table inasmuch as the outside of the bottle is not wet by contact with melting ice.

Referring now to Fig. 5, a dish is disclosed for serving cold food, such as ice cream or fruit. This dish comprises a receptacle having inner and outer walls 55 and 56 respectively which are separated and filled with a refrigerating substance 12 in a manner set forth above. These walls are flared as at 57 to provide a shoulder against which a heat insulating sleeve 58 is seated. Said sleeve 58 is readily removable from the receptacle, as for example when it is desired to place the receptacle in a refrigerator in order to freeze the substance 12 but during use serves as the support for said receptacle and comprises the outer surface of the dish. The sleeve should accordingly be formed with a surface which provides a neat and pleasing appearance inasmuch as it primarily is to be used on the table.

Fig. 6 discloses a drinking receptacle comprising inner and outer walls 59 and 60 respectively having cooling substance 12 held therein and provided with a threaded member 61 which is adapted to be inserted on a base 62 of heat insulating material. Said base provides the support for the drinking receptacle when placed upon a table and also serves as a convenient means for handling the same. In this case, however, inasmuch as the receptacle is to be directly applied to the lips, as in drinking, it is preferable to form the same of a material having a comparatively low heat conductivity, as for example German silver. Otherwise, the receptacle would be disagreeably cold to the touch and, if an extremely cold refrigerating substance were employed, the metal would tend to freeze to the lips.

While certain novel features of the invention have been disclosed and are pointed out in the annexed claims, it will be understood that the device may be modified in various ways and applied to various uses as will be apparent to those skilled in the art without departing from the spirit of the invention.

What is claimed is:

1. A food dispensing and refrigerating device comprising a receptacle having double walls spaced to receive a refrigerating medium therebetween and having hermetically sealed between said walls a substance having a negative coefficient of expansion on freezing and capable of freezing to solid form within the normal temperature range of artificial refrigeration.

2. A food dispensing and refrigerating device comprising a receptacle having double walls spaced to receive a refrigerating medium therebetween and having hermetically sealed between said walls a substance having a boiling point higher than the boiling point of water and having a substantially fixed freezing point and a negative coefficient of expansion on freezing and capable of freezing within the normal range of temperatures of artificial refrigeration.

3. A food dispensing and refrigerating device comprising a receptacle having double walls spaced to receive a refrigerating medium therebetween and having hermetically sealed between said walls a substance having a negative coefficient of expansion on freezing and having a boiling point substantially greater than that of water and capable of freezing to a solid state within the normal temperature range of artificial refrigeration.

4. A food dispensing and refrigerating device comprising a bowl-shaped receptacle having double curved walls formed of a material having a substantial elasticity, said walls being separated to provide a space therebetween and having hermetically sealed within said space a refrigerating medium in free fluid state having a coefficient of expansion on freezing less than that of water, the relationship between the expansion of said material and the elasticity of said walls being such that said walls are prevented from being injured due to the repeated freezing and melting of said substance.

5. A food dispensing and refrigerating device comprising a receptacle having double walls formed of a material having a substantial elasticity, said walls being separated to provide a space therebetween and having hermetically sealed within said space a refrigerating medium in free fluid state having a predetermined substantially invariable freezing point and a coefficient of expansion on freezing less than that of water and having a boiling point substantially above that of water, the relationship between the expansion of said material and the elasticity of said walls being such that said walls are prevented from being injured due to the repeated freezing and melting of said substance.

6. A cooling device adapted to be inserted in a food container comprising a cylindrical member having spaced walls of heat conducting material, the walls defining a closed space therebetween, a substance in said space having a predetermined substantially invariable melting point below the freezing point of water and within the normal temperature range of artificial refrigeration and transverse fins of heat conducting material within said cylindrical member and contacting the inner surface of said walls, said fins serving to refrigerate a fluid as it is passed thereover.

7. A cooling device adapted to be inserted in a food container comprising a cylindrical member having spaced walls of heat conducting material, the walls defining a closed space therebetween, a substance in said space having a predetermined substantially invariable melting point below the freezing point of water and within the normal temperature range of artificial refrigeration, transverse fins of heat conducting material within said cylindrical member and contacting with the inner surface of said walls and a liquid distributing member above said fins and adapted to discharge a liquid over said fins for cooling purposes.

8. A cooling device comprising a cylindrical member having spaced walls of heat conducting material, the walls defining a closed space therebetween, a substance in said space having a melting point within the normal temperature range of artificial refrigeration, helical transverse fins within said cylindrical member and contacting the inner surface of said walls, and a sleeve of heat insulating material removably secured around the outer surface of said walls and adapted to minimize heat loss and to provide a hand grip for said device.

9. A cooling device comprising a cylindrical member having spaced walls of heat conducting material, the walls defining a closed space therebetween, and a substance in said space having a melting point within the normal temperature range of artificial refrigeration, said cylindrical member being divided along a line parallel to its axis whereby a resilience is imparted thereto for resiliently gripping a bottle.

CARL GEORG MUNTERS.
ALVAR LENNING.